Patented Dec. 18, 1928.

1,695,756

UNITED STATES PATENT OFFICE.

HERMANN BOTS AND ANDRÉ CATINEAU, OF BASEL, SWITZERLAND, ASSIGNORS TO THE FIRM SOCIETY OF CHEMICAL INDUSTRY IN BASLE, OF BASEL, SWITZERLAND.

BLUISH SULPHURIZED INDOPHENOL DYES AND PROCESS OF MAKING THE SAME.

No Drawing. Application filed November 9, 1925, Serial No. 68,024, and in Switzerland November 28, 1924.

In the United States Patent No. 1,565,736, there have been described new bluish sulphurized indophenol-benzidine dyes and process of making the same, obtained by reducing the indophenols made from nitrosophenols and carbazole and treating the leucocompound with sulphur at raised temperature and in presence of benzidine. These dyestuffs show higher capacity of dyeing and better properties of fastness than those made under the same conditions but without addition of benzidine.

It has now been found that by replacing the benzidine by aromatic aminocompounds corresponding to hydrocarbons having less than 12 carbon atoms, such as aniline, the toluidines, the chloroanilines, the naphthylamines or the derivatives or parent materials of same, as for instance acetoanilide, carbanilide, diarylanilines, N-alkylanilines, naphthylamines, nitroanilines etc., and by sulphurizing at raised temperature if desired in presence of a water soluble substratum such as common salt, sodium sulphate, sodium thiosulphate, alkali metal carbonates, naphthalenetrisulphonate of sodium etc., also new, valuable, strong and fast vat dyestuffs are obtained.

The new dyestuffs form dark powders insoluble in water, soluble in concentrated sulphuric acid with blue coloration, producing with sodium hydrosulphite and caustic soda yellow vats and with alkali metal sulphides greenish vats which dye the vegetable fibre in blue to greenish-blue shades very fast to washing, to light and chlorine.

Example 1.

27.2 parts of the indophenol made by condensing nitrosophenol and carbazole are introduced into a concentrated solution of polysulphides from 29 parts of crystallized sodium sulphide and 10 parts of sulphur, the whole being stirred until the indophenol is completely reduced. The mass is then dried and carefully mixed with 16 parts of diphenylurea, 10 parts of sulphur and 10 parts of common salt. The mixture thus obtained is heated slowly to 180° with reduced or raised pressure, preferably with exclusion of oxygen, and kept for some hours at this temperature. The product thus obtained is finely ground after cooling, washed, first with dilute sodium sulphide, then with water, and finally with dilute hydrochloric acid in order to eliminate remaining aniline or organic bases. There is thus obtained with excellent yield an intense blue dyeing dyestuff.

By replacing in this example the diphenylurea by the o-ditolylurea a very similar dyestuff is obtained. Much redder dyestuffs are obtained by replacing the ureas mentioned by the acetoanilide or the aceto-orthotoluidide. Fast dyestuffs are also obtained if the indophenol is sulphurized in presence of p-toluene sulphanilide.

Example 2.

27.2 parts of the indophenol made by condensing nitrosophenol and carbazole are introduced into a concentrated solution of polysulphides from 29 parts of crystallized sodium sulphide and 10 parts of sulphur and stirred until the indophenol is completely reduced. The whole mass is then dried and carefully mixed with 14 parts of aniline, 10 parts of sulphur and 10 parts of common salt. The mixture is treated as indicated in the above example, preferably in a reflux apparatus, and the reaction product worked up as usual.

The aniline may be replaced in this example by other amines. Valuable dyestuffs are obtained, among others, with the following bases: the ortho- and para-toluidines, dimethylaniline, the paranitraniline, the paraphenylenediamine, the acetyl-paraphenylenediamine and the diphenylamine. The dyestuffs obtained by means of the para-toluidine, the diphenylamine and the paranitraniline or the paraphenylenediamine are distinguished by their greenish shade.

What we claim is:

1. The herein described process for the production of bluish sulphurized indophenol dyes by reducing the indophenols made from nitrosophenols and carbazole and sulphurizing the leucoderivative thus obtained in presence of aromatic aminocompounds corresponding to hydrocarbons having less than 12 carbon atoms at substantially 180°.

2. The herein described process for the production of bluish sulphurized indophenol dyes by reducing the indophenols made from nitrosophenols and carbazole and sulphurizing the leucoderivative thus obtained in presence of aromatic aminocompounds corresponding to hydrocarbons having less than 12 carbon atoms and of a water soluble substratum at substantially 180°.

3. The herein described process for the production of bluish sulphurized indophenol dyes by reducing the indophenols made from nitrosophenols and carbazole and sulphurizing the leucoderivative thus obtained in presence of aromatic aminocompounds corresponding to hydrocarbons of the benzene series at substantially 180°.

4. The herein described process for the production of bluish sulphurized indophenol dyes by reducing the indophenols made from nitrosophenols and carbazole and sulphurizing the leucoderivative thus obtained in presence of aromatic aminocompounds corresponding to hydrocarbons of the benzene series and of a water soluble substratum at substantially 180°.

5. The herein described process for the production of bluish sulphurized indophenol dyes by reducing the indophenols made from nitrosophenols and carbazole and sulphurizing the leucoderivative thus obtained in presence of aromatic aminocompounds corresponding to benzene at substantially 180°.

6. The herein described process for the production of bluish sulphurized indophenol dyes by reducing the indophenols made from nitrosophenols and carbazole and sulphurizing the leucoderivative thus obtained in presence of aromatic aminocompounds corresponding to benzene, and of common salt at substantially 180°.

7. The herein described new bluish sulphurized indophenol dyestuffs obtained by reducing the indophenols made from nitrosophenols and carbazole and sulphurizing at substantially 180° the leucoderivatives thus obtained in presence of aromatic aminocompounds corresponding to hydrocarbons having less than 12 carbon atoms, which dyestuffs form dark powders insoluble in water, soluble in concentrated sulphuric acid with blue coloration, producing with sodium hydrosulphite and caustic soda yellow vats and with alkali metal sulphides greenish vats which dye the vegetable fibre in blue to greenish-blue shades very fast to washing, to light and chlorine.

8. Material dyed with the products of claim 7.

In witness whereof we have hereunto signed our names this 29th day of October, 1925.

HERMANN BOTS.
ANDRÉ CATINEAU.